Figure 1:
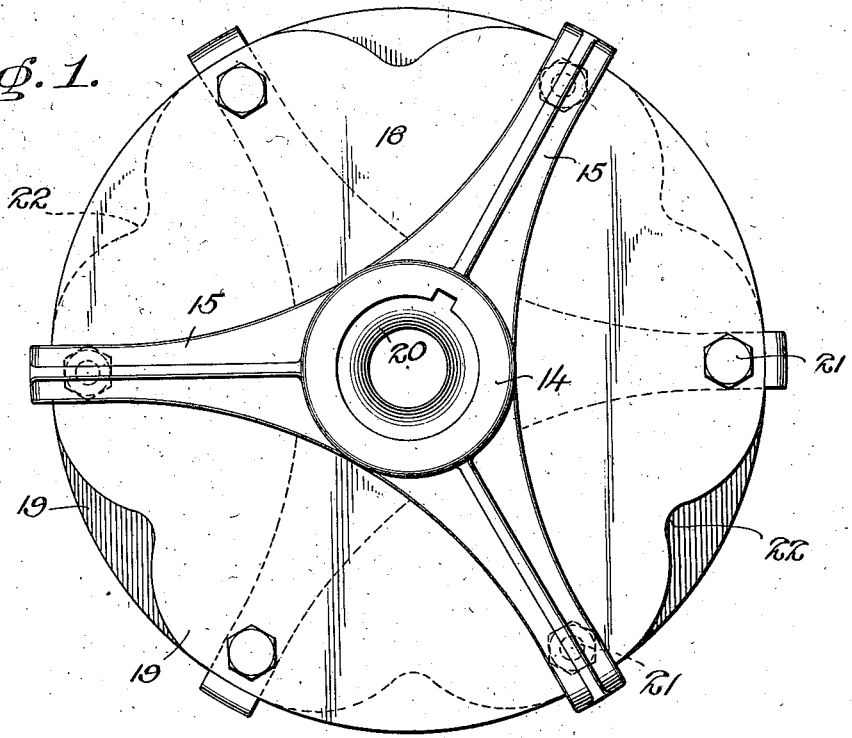

July 8, 1924.  
J. N. POWERS  
FLEXIBLE COUPLING  
Filed March 29, 1922

1,500,959

Inventor  
John N. Powers,  
BY Bright & Bailey  
Attorneys

Patented July 8, 1924.

1,500,959

UNITED STATES PATENT OFFICE.

JOHN N. POWERS, OF WASHINGTON, DISTRICT OF COLUMBIA.

FLEXIBLE COUPLING.

Application filed March 29, 1922. Serial No. 547,878.

*To all whom it may concern:*

Be it known that I, JOHN N. POWERS, a citizen of the United States, and resident of Washington, in the District of Columbia, have invented certain new and useful Improvements in Flexible Couplings, of which the following is a specification.

My invention relates to shaft couplings of the flexible disk type, and it is my purpose to improve the construction of couplings of this type whereby maximum flexibility is combined with strength and substantial rigidity to the end that applications of load or torque may be transmitted instantly, positively and uniformly from the driving shaft element to the driven shaft element, and vice versa. My improvements do not contemplate sacrificing any of the many advantages of a flexible disk coupling over other types of universal joints, but to the contrary retain all of the advantages of present types of flexible disk couplings with the added benefits of durability and longevity.

My inventive idea is capable of embodiment in different mechanical constructions and arrangements, one of which is illustrated in the accompanying drawings, but it is to be understood that the structure shown is merely intended as a disclosure of the essential features and novel characteristics of my invention in a preferred form, and that various changes, modifications, and desirable additions may be made in and to the same within its scope as defined in the appended claims.

In the drawings which are illustrative of features of novelty to be more fully described hereinafter, and wherein like characters of reference denote corresponding parts in the different views.

Figure 2:
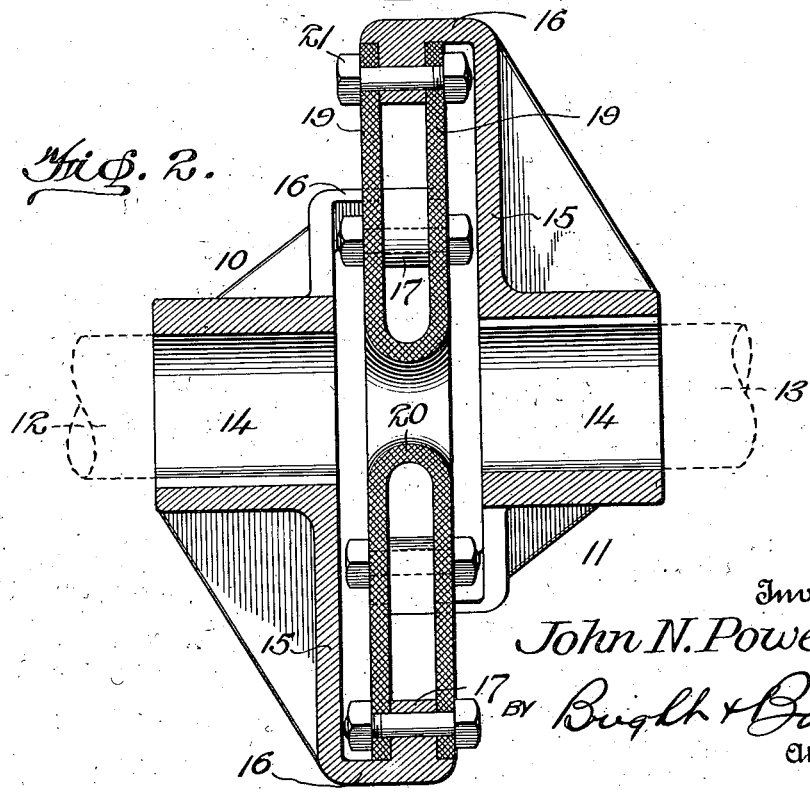

Figure 1 is an end elevation of a flexible coupling embodying novel and essential characteristics of my invention; and Figure 2 is a central longitudinal section through the coupling.

Referring now to the drawings in detail, it will be observed that the specific embodiment of my invention illustrated consists of a pair of three armed spider forgings, 10 and 11, secured upon the ends of a pair of shafts 12 and 13, respectively, and adapted to be flexibly connected together whereby rotary movement of either shaft will impart corresponding movement to the other shaft. The forgings 10 and 11 are to all intents and purposes exact duplicates of one another and as shown each of them comprises a hub portion 14 formed with equi-distantly-spaced, radially extending arms 15 which are bent at right angles upon themselves or otherwise formed to provide longitudinally extending end portions 16, each of which is provided with an inwardly disposed lug 17.

The flexible coupling member 18 of my invention is of annular form and includes relatively spaced end portions 19, 19 which are mutually and flexibly connected by an inner continuous web portion 20. It is assembled with the forgings 10 and 11 by disposing the lug 17 of the arms between the end portions 19, 19 and extending fastening bolts 21 through alined openings in the lugs and end portions whereby the latter are clamped against opposite faces of the lugs and are retained by the latter in relative spaced relation. In securing the coupling member to the forgings the arms 15 of one forging are disposed intermediate or alternate with respect to the arms of the other forging so that either forging is permitted to be moved in any direction angularly with respect to the axis of rotation of the other forging, such movement being permitted by flexure of the coupling member 19 at its web portion 20, as is apparent.

By reason of the continuous annular coupling member and its interlocked relation with the arms of the forgings, rotary movement imparted to either forging will be instantly, positively and uniformly transmitted to the other forging and, as there is no possibility of one forging rotating relative to the other, the coupling is never distorted by such relative rotation and its longevity is thereby assured.

The coupling member 19 preferably is formed as an integral unit of leather, laminated fabric or other material possessing a certain amount of elasticity and capable of withstanding severe strains, but if desired the end portions thereof may be formed of stiff and rigid material such as metal, and the web portion only may be formed of leather or fabric, as essentially it is the web that imparts desired flexibility to the member and therefore only this portion of the member need be formed of flexible material. In other words, my invention with respect to the coupling member contemplates a continuous annular device having relatively spaced, mutually and flexibly connected end portions, and when I so define it in my claims I mean to include any coupling member whether formed of one piece or a combination of materials.

In order that the coupling member 19 may be quickly and easily assembled and disassembled with respect to the arms of the forgings 10 and 11 I provide recesses 22 in the outer peripheral edges of the end portions 19, 19 so that the lugs 17 may be passed therethrough into the space between said end portions. Preferably the recesses in one end portion are staggered with respect to the recesses in the other end portion, although this is not necessary, and to assemble the coupling the lugs on the arms of the forgings are first passed through said recesses, and the forging and member then are rotated relatively to aline the bolt receiving openings in the lugs with the similar openings in the member. The fastening bolts 21 are then passed through these alined openings and the end portions 19, 19 are clamped thereby against opposite faces of the lugs.

If desired, I may form the lugs 17 on the outside instead of the inside faces of the portions 16 of the spider arms and I may also reverse the arrangement of the coupling member so that the web portion may be disposed outwardly instead of inwardly as illustrated. If this is done the operation of the coupling is not effected, but it is rendered less compact than if the coupling member is constructed and connected with the forgings in the manner indicated.

From the foregoing description taken in connection with the accompanying drawings, it is believed that the construction, operation and advantages of my improved flexible coupling will be clearly understood and while I have herein shown and described one specific embodiment of my invention, I do not limit myself to the detail structural arrangements shown, except for such limitations as may be contained within the scope of the appended claims.

I claim:—

1. A shaft coupling comprising driving and driven elements, and a flexible connection between said elements consisting of an annular member having relatively spaced end portions, means securing both of said end portions to each of said driving and driven elements, and means independent of said securing means mutually and positively connecting said end portions.

2. A shaft coupling comprising driving and driven elements, and a flexible connection between said elements consisting of an annular member having relatively spaced end portions, means securing both of said end portions directly to each of said driving and driven elements, and means independent of said securing means mutually and positively connecting said end portions.

3. A shaft coupling comprising driving and driven elements, and a flexible connection between said elements consisting of an annular member having relatively spaced end portions, means securing each of said end portions to each of said driving and driven elements at relatively staggered points, and means independent of said securing means mutually and positively connecting said end portions.

4. A shaft coupling comprising driving and driven elements, and a flexible connection between said elements consisting of an annular member having relatively spaced end portions, means securing each of said end portions to each of said driving and driven elements at circumferentially spaced points, respectively, and means independent of said securing means mutually and positively connecting said end portions.

5. A shaft coupling comprising driving and driven elements, and a flexible connection between said elements consisting of an annular member having relatively spaced end portions, means securing each of said end portions to each of said driving and driven elements at alternate circumferentially spaced points, respectively, and means independent of said securing means mutually and positively connecting said end portions.

6. A shaft coupling comprising driving and driven elements, and a flexible connection between said elements consisting of an annular member having relatively spaced end portions, means rigidly securing each of said end portions to each of said driving and driven elements, and means independent of said securing means mutually and positively connecting said end portions.

7. A shaft coupling comprising driving and driven elements, and a flexible connection between said elements consisting of an annular member having relatively spaced end portions, means rigidly securing both of said end portions to each of said driving and driven elements, and means independent of said securing means mutually and positively connecting said end portions.

8. A shaft coupling comprising driving and driven elements each having plural radially disposed arms, a lug on each arm, and a flexible connection between said elements consisting of an annular member having relatively spaced, mutually connected end portions clamped against opposite faces of the lugs on all of said arms.

9. A shaft coupling comprising driving and driven elements each having plural radially disposed arms, a lug on each arm, and a flexible connection between said elements consisting of an annular member having relatively spaced, mutually connected end portions clamped against opposite faces of the lugs on all of said arms, the end portions of said annular member being provided with peripheral recesses to permit assembly and disassembly of the coupling.

10. A shaft coupling comprising driving and driven elements each having plural radially disposed arms, a lug on each arm, and a flexible connection between said elements consisting of an annular member having relatively spaced, mutually connected end portions clamped against opposite faces of the lugs on all of said arms, the end portions of said annular member being provided with peripheral recesses to permit assembly and disassembly of the coupling, the recesses in one of said end portions being circumferentially spaced with respect to the recesses in the other end portion.

11. A shaft coupling comprising driving and driven elements each having plural, radially disposed arms, a lug on each arm, a flexible connection between said elements consisting of an annular member having relatively spaced, mutually connected end portions disposed against opposite faces of the lugs on all of said arms, and fastening devices extending through said end portions and said lugs whereby said member is rigidly secured to said driving and driven elements.

12. A flexible coupling element consisting of an annular member having relatively spaced end portions, and means permanently connecting said end portions together whereby the member may be assembled in a coupling as a unit, said end portions being provided with securing device receiving openings and with peripheral recesses to facilitate assembly and disassembly of the member with and from a coupling.

In testimony whereof I hereunto affix my signature.

JOHN N. POWERS.